US010017186B2

(12) United States Patent
Wittliff

(10) Patent No.: US 10,017,186 B2
(45) Date of Patent: Jul. 10, 2018

(54) SYSTEM AND METHOD FOR OPTIMIZING VEHICLE SETTINGS

(71) Applicants: Bosch Automotive Service Solutions Inc., Warren, MI (US); Robert Bosch GmbH, Stuttgart (DE)

(72) Inventor: William W. Wittliff, Gobles, MI (US)

(73) Assignees: Bosch Automotive Service Solutions Inc., Warren, MI (US); Robert Bosch GmbH, Stuttgart (DE)

(*) Notice: Subject to any disclaimer, the term of this patent is extended or adjusted under 35 U.S.C. 154(b) by 0 days.

(21) Appl. No.: 14/974,826

(22) Filed: Dec. 18, 2015

(65) Prior Publication Data

US 2016/0177846 A1 Jun. 23, 2016

Related U.S. Application Data

(60) Provisional application No. 62/094,168, filed on Dec. 19, 2014.

(51) Int. Cl.
*G06F 7/00* (2006.01)
*B60W 40/02* (2006.01)
*G01C 21/26* (2006.01)
*F02D 41/26* (2006.01)
*F02D 41/24* (2006.01)
*F02D 41/28* (2006.01)

(52) U.S. Cl.
CPC .......... *B60W 40/02* (2013.01); *F02D 41/266* (2013.01); *G01C 21/26* (2013.01); *B60W 2550/12* (2013.01); *B60W 2550/13* (2013.01); *B60W 2550/40* (2013.01); *F02D 41/2432* (2013.01); *F02D 41/28* (2013.01); *F02D 2200/701* (2013.01)

(58) Field of Classification Search
USPC .......................................................... 701/36
See application file for complete search history.

(56) References Cited

U.S. PATENT DOCUMENTS

| 4,519,353 | A | * | 5/1985 | Ito ........................... F02D 41/22 123/198 DB |
| 6,151,547 | A | * | 11/2000 | Kumar ................ G01M 15/102 60/274 |
| 9,332,126 | B2 | * | 5/2016 | Tadayon ............... H04W 48/02 |

(Continued)

*Primary Examiner* — Jean Paul Cass
(74) *Attorney, Agent, or Firm* — Maginot Moore & Beck LLP

(57) ABSTRACT

An optimization system for a vehicle includes a dongle and a wireless device. The vehicle includes a diagnostic port and an electronic control unit (ECU) electrically connected to the diagnostic port. The ECU includes a memory storing vehicle setting data. The dongle is configured to connect with the diagnostic port to enable the dongle to establish a wired communication link with the ECU. The wireless device includes a memory storing program instructions and a processor configured to execute the program instructions to establish a wireless communication link between the ECU and the wireless device via the connected dongle, to determine location data representative of a location of the vehicle, to determine environmental condition data at the location of the vehicle, to receive the vehicle setting data from the ECU, and to generate optimized vehicle setting data using at least the vehicle setting data and the environmental condition data.

6 Claims, 3 Drawing Sheets

(56) References Cited

U.S. PATENT DOCUMENTS

| | | | |
|---|---|---|---|
| 9,574,882 B2* | 2/2017 | Schilling | G01C 21/20 |
| 9,632,746 B2* | 4/2017 | Keipert | G06F 3/165 |
| 2005/0028791 A1* | 2/2005 | Niimi | F02D 19/0628 |
| | | | 123/478 |
| 2005/0102074 A1* | 5/2005 | Kolls | B60R 25/04 |
| | | | 701/31.4 |
| 2006/0026017 A1* | 2/2006 | Walker | G06Q 10/00 |
| | | | 701/31.4 |
| 2006/0206246 A1* | 9/2006 | Walker | G06Q 10/00 |
| | | | 701/16 |
| 2011/0055277 A1* | 3/2011 | Resch | G06F 11/1004 |
| | | | 707/785 |
| 2011/0195699 A1* | 8/2011 | Tadayon | H04B 5/0062 |
| | | | 455/418 |
| 2012/0253552 A1* | 10/2012 | Skelton | B60K 28/063 |
| | | | 701/2 |
| 2013/0151111 A1* | 6/2013 | Skelton | B60R 25/00 |
| | | | 701/99 |
| 2013/0212659 A1* | 8/2013 | Maher | H04L 63/06 |
| | | | 726/6 |
| 2013/0238830 A1* | 9/2013 | Pouchak | H04L 12/2803 |
| | | | 710/305 |
| 2014/0147154 A1* | 5/2014 | Arai | G03G 15/50 |
| | | | 399/75 |
| 2014/0244110 A1* | 8/2014 | Tharaldson | G07C 5/008 |
| | | | 701/36 |
| 2015/0015376 A1* | 1/2015 | Jenkins | H04Q 9/00 |
| | | | 340/12.5 |
| 2015/0160663 A1* | 6/2015 | McCarthy, III | G07C 9/00571 |
| | | | 700/283 |
| 2015/0163412 A1* | 6/2015 | Holley | G05B 15/02 |
| | | | 348/143 |
| 2015/0195297 A1* | 7/2015 | Ben Noon | B60R 16/023 |
| | | | 726/22 |
| 2015/0197205 A1* | 7/2015 | Xiong | B60R 16/037 |
| | | | 701/49 |
| 2016/0003621 A1* | 1/2016 | Koenig | G01C 21/00 |
| | | | 701/31.4 |
| 2016/0047565 A1* | 2/2016 | Robinson | H04L 12/2803 |
| | | | 700/278 |
| 2016/0177846 A1* | 6/2016 | Wittliff | F02D 41/266 |
| | | | 701/36 |
| 2016/0297324 A1* | 10/2016 | Taylor | B60N 2/002 |
| 2016/0327921 A1* | 11/2016 | Ribbich | F24F 11/30 |
| 2016/0342379 A1* | 11/2016 | Keipert | G06F 3/165 |
| 2016/0362085 A1* | 12/2016 | Skelton | B60R 25/00 |
| 2017/0054615 A1* | 2/2017 | Wilson | H04W 4/029 |

* cited by examiner

SYSTEM AND METHOD FOR OPTIMIZING VEHICLE SETTINGS

This application claims the benefit of priority of U.S. provisional application Ser. No. 62/094,168, filed on Dec. 19, 2014 the disclosure of which is herein incorporated by reference in its entirety.

This disclosure relates generally to automotive diagnostic systems and particularly to a system and a method for optimizing vehicle settings using environment data.

BACKGROUND

In recent years, vehicles and the field of automotive maintenance have experienced rapid growth in computerized systems both within automotive vehicles and in computerized diagnostic tools that identify maintenance issues with the vehicles. For example, most modern vehicles include one or more computer systems that are often referred to as an electronic control unit (ECU). In some vehicles, the ECU controls and monitors the operations of numerous systems including, but not limited to, the engine, steering, tires, transmission, brakes, fuel delivery or battery level monitoring, and climate control systems. Some vehicles also include numerous sensors that monitor various aspects of the operation of the vehicle. The ECU receives the sensor data and is configured to generate diagnostic trouble codes (DTCs) if the sensors indicate that one or more systems in the vehicle may be failing or operating outside of predetermined parameters.

Many vehicles use a controller area network (CAN) vehicle bus to transmit data between the ECU and the onboard sensors, components, and systems in the vehicle. The CAN bus, or other equivalent data networks in a vehicle, provides a common communication framework between the ECU and the various sensors and systems in the vehicle. Additionally, the CAN bus or equivalent network enables communication between the ECU and external diagnostic tools through a port that is typically accessible from within a cabin of the vehicle near the driver's seat. The ECU and the diagnostic tools interfaced therewith often use an industry standard protocol, such as a version of the on-board diagnostics (OBD) protocol, including the OBD-II protocol.

The operation of an ECU controlled engine is influenced by many factors including variations in environmental conditions, such as the weather. The typical ECU, however, does not account for environmental variations, thereby resulting in an engine that may not be optimized for the conditions in which it is being operated. Accordingly, a need exists for a method and system to quickly and easily optimize ECU controlled engine settings so that optimum engine performance is achieved.

SUMMARY

According to an exemplary embodiment of the disclosure, a method is disclosed of optimizing vehicle settings of a vehicle using an optimization system. The optimization system includes a dongle and a wireless device. The vehicle includes a diagnostic port and an electronic control unit (ECU) electrically connected to the diagnostic port. The ECU includes a memory storing vehicle setting data. The method includes establishing a wired communication link between the ECU and the dongle by connecting the dongle to the diagnostic port, establishing a wireless communication link between the ECU and the wireless device via the connected dongle, and determining location data representative of a location of the vehicle by determining location data representative of a location of the wireless device using the wireless device. The method further includes determining environmental condition data at the location of the vehicle using the wireless device, sending the vehicle setting data from the ECU to the wireless device via the connected dongle, generating optimized vehicle setting data using at least the vehicle setting data and the environmental condition data, and sending the optimized vehicle setting data from the wireless device to the ECU via the connected dongle.

According to another exemplary embodiment of the disclosure, an optimization system for a vehicle is disclosed. The vehicle includes a diagnostic port and an electronic control unit (ECU) electrically connected to the diagnostic port. The ECU includes a memory storing vehicle setting data. The optimization system includes a dongle and a wireless device. The dongle is configured to connect with the diagnostic port to enable the dongle to establish a wired communication link with the ECU. The wireless device includes a memory storing program instructions and a processor configured to execute the program instructions to establish a wireless communication link between the ECU and the wireless device via the connected dongle, to determine location data representative of a location of the vehicle, to determine environmental condition data at the location of the vehicle, to receive the vehicle setting data from the ECU, to generate optimized vehicle setting data using at least the vehicle setting data and the environmental condition data, and to send the optimized vehicle setting data to the ECU via the connected dongle.

BRIEF DESCRIPTION OF THE DRAWINGS

The above-described features and advantages, as well as others, should become more readily apparent to those of ordinary skill in the art by reference to the following detailed description and the accompanying figures in which.

DETAILED DESCRIPTION

Figure 1:
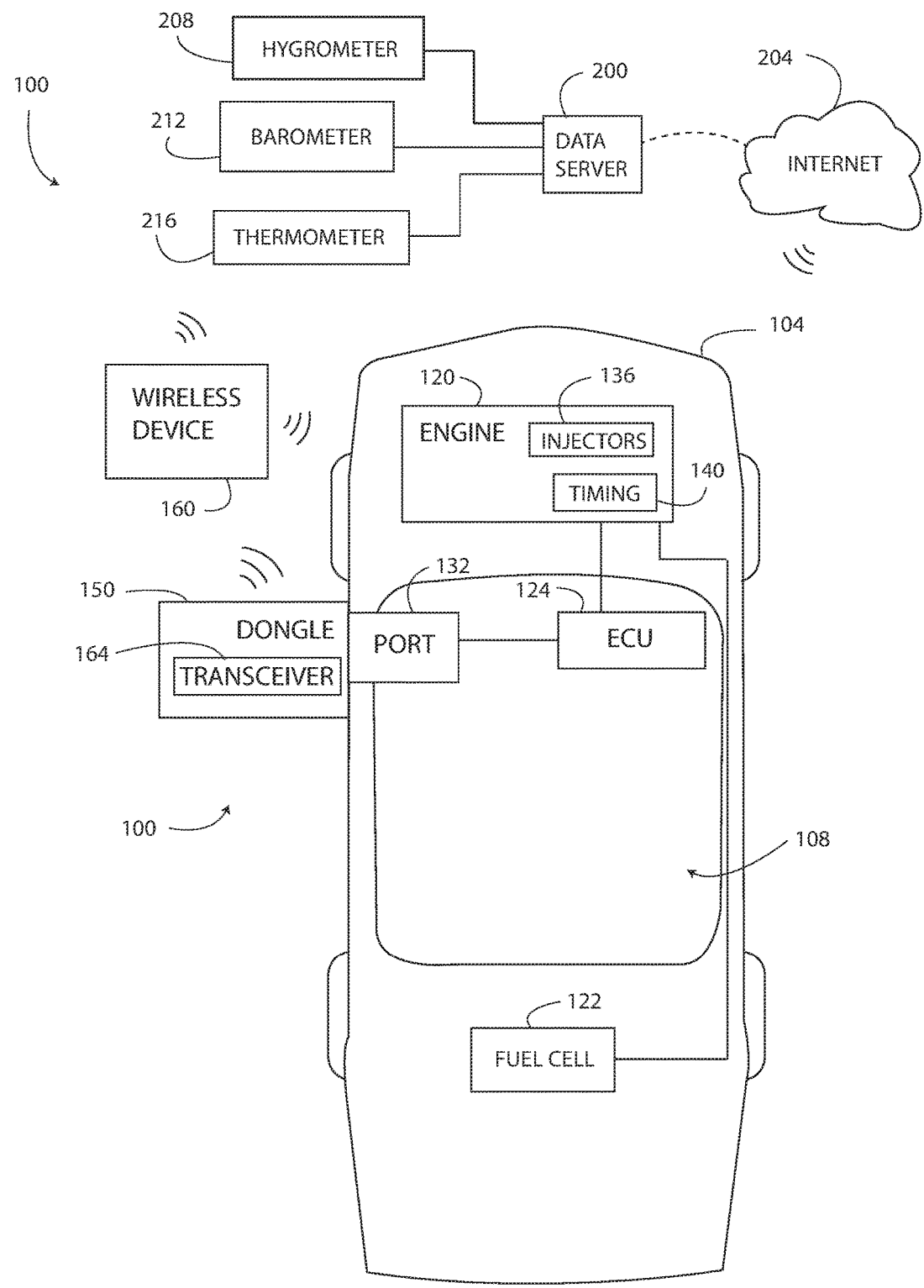
FIG. 1 is a block diagram showing a top plan view of a vehicle and a wireless device, as described herein, that is configured to optimize settings of the vehicle.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

As shown in FIG. 1, an optimization system 100 is associated with a vehicle 104. The vehicle 104 is representative of any type of vehicle including, but not limited to, passenger motor vehicles, commercial motor vehicles, airplanes, ships, and boats. The exemplary vehicle 104 includes a cabin 108, an engine 120, a fuel cell 122, an ECU 124, and a diagnostic port 132.

The engine 120, in one embodiment, is an internal combustion engine configured to burn fuel from the fuel cell. The engine 120 includes at least one fuel injector 136 and an ignition timing system 140, among the many other components typically included with an internal combustion engine, as are known to those of ordinary skill in the art.

The fuel injector 136 is configured to inject fuel into a combustion chamber (not shown) of the engine 120 in response to receiving an electronic injection signal. A rate of injection and an amount of fuel injected per injection is controllable based on parameters of the electronic injection signal. Other aspects associated with injection of the fuel may also be controllable based on the parameters of the electronic injection signal. The fuel injector(s) 136 is provided as any desired fuel injector(s).

The ignition timing system 140 is configured to send an electronic ignition signal to spark plugs (not shown) of the engine 120 at a proper time for causing the fuel injected into the combustion chamber to ignite. The timing system 140 is configurable to send the electronic ignition signal at a desired time based on a position of a piston (not shown) moving within the combustion chamber of the engine 120, among other factors.

The ECU 124 is a computer that is configured to monitor various sensors and systems that are associated with the engine 120, such as the injectors 136 and the timing system 140 as well as other components of the vehicle 104. In particular, the ECU 124 is configured to control the parameters of the electronic injection signal and the configuration of the timing system 140. Additionally, the ECU 124 generates and stores data related to the operation of the vehicle 104. Specifically, the ECU 124 includes a memory (not shown) configured to store vehicle setting data. The vehicle setting data includes data that controls how the ECU operates the fuel injector 136 and the ignition timing system 140, for example. In one embodiment, the vehicle setting data includes data controlling the rate of injection and the amount of fuel injected per injection of the fuel injector 136. The vehicle setting data may also include data that controls when the electric ignition signal of the ignition timing system 140 is generated.

The port 132, which is also referred to herein as a connector and/or an OBD connector, is typically located within the cabin 108 of the vehicle 104 in a position that is accessible by an operator of the vehicle. The port 132 is electrically connected to the ECU 124 and is a communication interface for interfacing with the ECU. Data is transmittable to and from the ECU 124 through the port 132, such that data generated and stored by the ECU 124 is transmittable to a hardware device that is connected to the port 132, and data generated by a hardware device connected to the port 132 is transmittable to the ECU 124.

The optimization system 100 includes a dongle 150 and a wireless device 160. The dongle 150 is a hardware device that, in one embodiment, mates or connects with the port 132 to establish a wired communication link with the ECU 124 that enables the dongle 160 to send data to the ECU 124 and to receive data from the ECU. Additionally, the dongle 150 is configured to send data generated by the ECU 124 to the wireless device 160. In one embodiment, the dongle 150 is a vehicle communication interface (VCI) that includes a wireless transceiver 164 configured to transmit selected data generated by the ECU 124 to another hardware device, such as the wireless device 160, using any desired wireless communication protocol. The dongle 150 is configured to obtain data from the ECU 124 via standard vehicle protocols, such as SAE-J1850 VPW, SAE-J1850 PWM, and ISO9141, as well as enhanced data. In another embodiment, the dongle 150 is configured to wirelessly data to the ECU 124 and to receive data from the ECU. In such an embodiment, the dongle 150 may be included in the wireless device 160.

Figure 2:
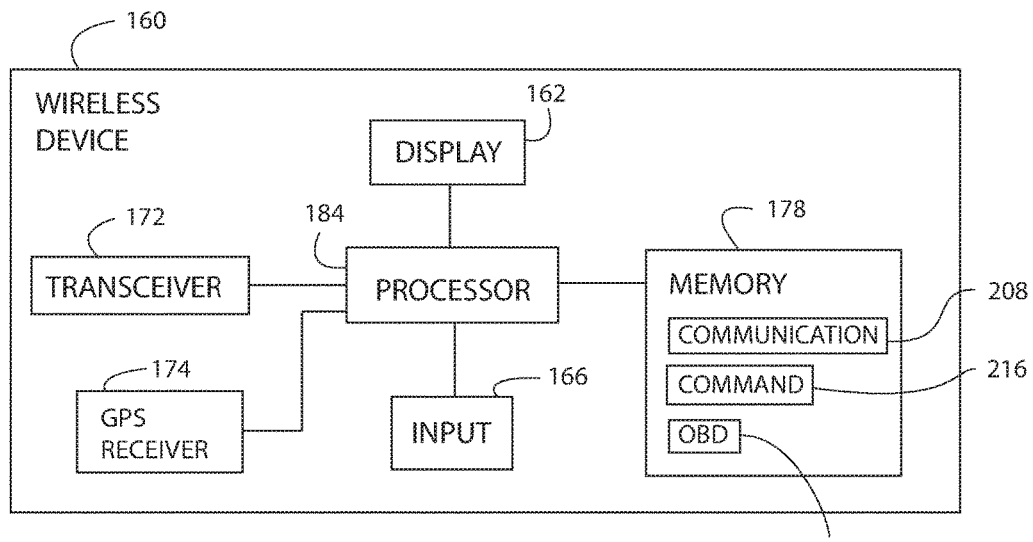
FIG. 2 is a block diagram of the wireless device of FIG. 1.

As shown in FIG. 2, the wireless device 160 includes a display 162, an input device 166, a transceiver 172, a GPS receiver 174, and a memory 178 each of which is connected to at least one processor 184. The wireless device 160 is typically a cellular phone/mobile phone, a smartphone, a tablet computer, or the like. Accordingly, the wireless device 160 is usable as a cellular phone.

The display 162 is liquid crystal display (LCD) panel configured to display text, images, and other visually comprehensible data. The display 162, in another embodiment, is any display as desired by those of ordinary skill in the art, including, but not limited to, an active-matrix organic light-emitting diode display.

The input device 166 is a touchscreen applied over the display 162. The input device 166 is configured to respond to the touch of a finger or a stylus. The input device 166 is configured to enable a user to enter text data and to manipulate objects shown on the display 162. In another embodiment, the input device 166 is a button, a keyboard or any device configured to generate an input signal, as desired by those of ordinary skill in the art.

The transceiver 172, which is also referred to as a wireless transmitter and receiver, is operably connected to the processor 184 and is configured to wirelessly communicate with the transceiver 164 of the dongle 150 either directly or indirectly via a cellular network, a wireless local area network ("Wi-Fi"), a personal area network, and/or any other wireless network. Accordingly, transceiver 172 establishes a wireless communication link between the ECU 124 and the dongle 150, when the dongle 150 is connected to the port 132. The transceiver 172 is compatible with any desired wireless communication standard or protocol including, but not limited to, Near Field Communication ("NFC"), IEEE 802.11, IEEE 802.15.1 ("Bluetooth"), Global System for Mobiles ("GSM"), and Code Division Multiple Access ("CDMA").

The GPS (Global Positioning System) receiver 174 is connected to the processor 184 and is configured to receive GPS signals and GPS data from GPS satellites (not shown). The GPS receiver 174 is further configured to determine its position on the Earth based on the received GPS signals.

The processor 184 is configured to store program instructions (i.e. software) in the memory 178. The processor 184 is operably connected to the memory 178 and is configured to execute the program instructions for operating the components connected thereto, such as the display 162, the input device 166, the transceiver 172, and the GPS receiver 174.

The memory 178, in one embodiment, is configured store communication software 208, OBD software 212, and command software 216. The processor 184 utilizes the communication software 208 to wirelessly communicate with the Internet 204. Communicating with the Internet 204 includes sending data to remote devices connected to the Internet, and receiving data from remote devices connected to the Internet, among other types of data transmission. The processor 184 utilizes the OBD software 212 for, among other things, determining current vehicle settings, such as engine timing settings and fuel injector settings and/or any other vehicle setting that is controlled/monitored by the ECU 124 and is included in the vehicle setting data. The processor 184 utilizes the command software 216 for generating electronic commands for changing vehicle settings in the ECU 124. Accordingly, the command software 216 generates electronic instructions for changing vehicle settings that are sent to the dongle 150, to the port 132, and then to the ECU 124.

Figure 3:
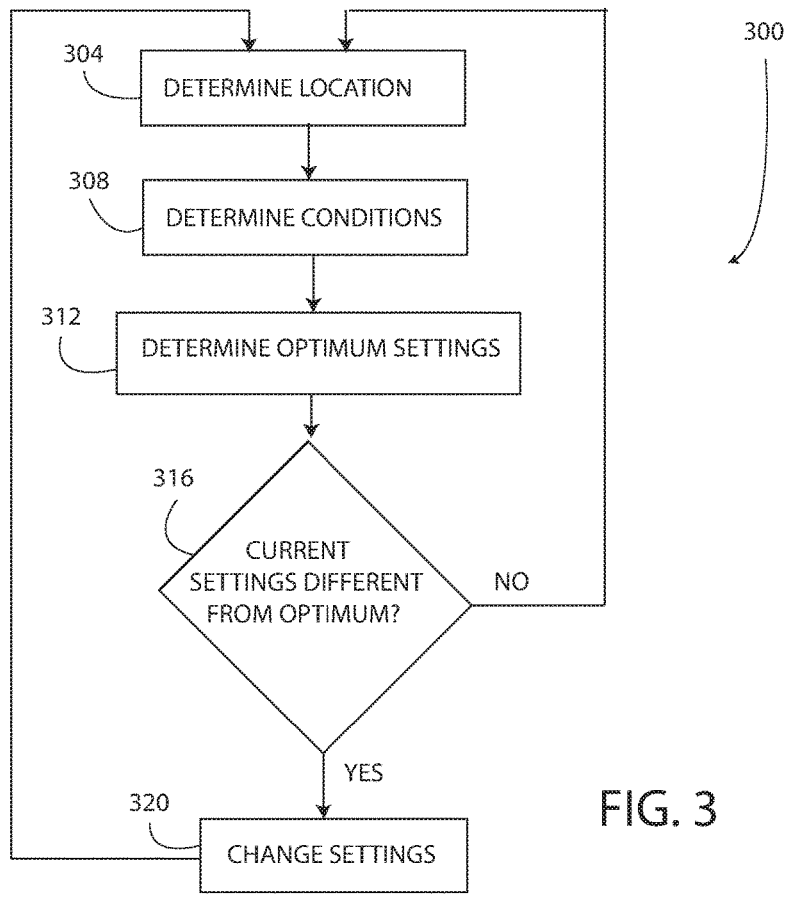
FIG. 3 is a flowchart illustrating an exemplary method of optimizing settings of the vehicle using the wireless device of FIG. 1.

In operation and as shown in FIG. 3, the optimization system 100 is configured to implement a method 300 of optimizing settings of the vehicle 104. In the embodiment described herein, vehicle settings are optimized based on the environmental conditions in which the vehicle 104 is being operated. Exemplary environmental conditions include temperature, relative humidity, and barometric pressure. In other embodiments, the optimization system 100 may be configured to optimize the vehicle settings based on any desired condition that affects operation of the vehicle 104 and/or efficiency of the engine 120.

As shown in block 304, the method 300 begins with determining location data that is representative of the location of the vehicle 104. In particular, the location of the vehicle 104 is found by determining location data that is representative of the location of the wireless device 160, which is typically positioned in the cabin 108 of the vehicle 104. Thus, the location of the wireless device 160 is the same as the location of the vehicle 104. The location of the wireless device 160 may be determined according to any desired process and then stored in the memory 178. In one embodiment, the location of the wireless device 160 is determined by the GPS receiver 174, which receives GPS signals and GPS data and then determines the location data of the wireless device 160 using the GPS signal/data and a desired process. Typically, when the location data is determined with GPS data, the location data includes latitude data and longitude data. In another embodiment, the location of the wireless device 160 is determined by determining the location of a nearby cell site (not shown) that is broadcasting cellular network signals. In such an embodiment, the wireless device 160 determines the identity of a nearby cell site and then accesses a data server 200 on the Internet 204 to determine the location of the cell site.

Next, in block 308 the wireless device 160 determines environmental condition data that is representative of the environmental conditions at or near the location of the vehicle 104 by accessing the data server 200 through the cellular network (or any other data network). Various sensors, such as a hygrometer 208, a barometer 212, and a thermometer 216 are electrically connected (either directly or indirectly) to the data server 200 and are configured to provide the data server with environmental condition data at or near the location of the vehicle 104. The wireless device 160 is configured to query the data server 200 for data corresponding to the relative humidity (relative humidity data), the atmospheric pressure (atmospheric pressure data), and the temperature (temperature data) at or near the location of the vehicle 104.

In block 312, the wireless device 160 determines optimum vehicle settings based on the determined environmental conditions. The wireless device 160 receives the current vehicle setting data from the ECU 124 via the connected dongle 150. To determine the optimum settings, the wireless device 160 uses the vehicle setting data, the environmental condition data associated with the current location of the vehicle 104, and at least one of the OBD software 212 and an algorithm stored in the memory 178. In one embodiment, the algorithm references look up tables stored the memory 178 when determining the optimum settings. A look up table for each vehicle setting that is dependent on at least one environmental condition may be stored in the memory 178. The processor 184 stores the optimum settings (i.e. the optimized vehicle setting data) in the memory 178. In another embodiment, the optimum settings are determined outside of the wireless device 160 by a remote computer (not shown) that is connected to the Internet 204, and the wireless device downloads the optimum settings from the remote computer. For example, a wireless communication link is established between the wireless device 160 and the remote computer via the transceiver 172 and the internet 204. Then the vehicle setting data are wirelessly sent to the remote computer via the wireless communication link. The location data and the environmental condition data may also be wirelessly sent to the remote computer. Then the remote computer processes at least some of an algorithm, the vehicle setting data, the environmental condition data, and the location data to determine the optimized vehicle setting data. After determining the optimized vehicle setting data, the data is wirelessly sent to the wireless device 160 and received by the transceiver 172.

Exemplary vehicle setting data that may be optimized based on environmental condition data include the rate of injection of the fuel injector 136, an amount of fuel injected per injection of the fuel injector, and engine timing settings that are controlled by the ignition timing system 140. For example, in an area of low pressure less air is available for combustion, and to maintain a proper stoichiometric ratio of air to fuel, the amount of fuel injected per injection may be optimized by injecting less fuel per injection, thereby making the engine run "lean." To compensate for the lean engine setting, the engine timing may be optimized by retarding the timing using the ignition timing system 140. The database is configured to optimize each vehicle setting based on the environmental condition data and each other vehicle setting, such that the optimized engine timing is optimized based on the fuel injector settings and the environmental condition data. Many other vehicle settings may optimized according to the environmental data using desired optimization techniques, therefore the optimization system 100 is not limited to optimizing the vehicle settings described herein.

Next in block 316, the wireless device 160 determines if the current vehicle setting data are different from the optimized vehicle setting data. To prepare for making the comparison between the optimized settings and the current vehicle settings, the wireless device 160 pairs with the dongle 150 and issues a command for the dongle to retrieve the current vehicle setting data from the ECU 124. The dongle 150 then wirelessly transfers the current vehicle setting data from the dongle to the wireless device 160, and the wireless device stores the current vehicle setting data in the memory 178. After the current vehicle setting data and the optimized vehicle setting data are stored in the memory 178, the processor 184 makes the comparison.

If any of the current vehicle settings are different from the optimized vehicle settings the wireless device 160 transmits the pertinent optimized vehicle setting data to the dongle 150 along with a command for the dongle to send the optimized vehicle setting data to the ECU 124. As described in block 320, upon receiving the optimized vehicle setting data, the ECU 124 adjusts the vehicle settings accordingly.

The wireless device 160 is configured to continuously implement the method 300 so that optimized vehicle settings are determined for the present position of the vehicle 104 as the vehicle is driven. This is may be especially valuable if the vehicle 104 is to be regularly driven in areas having drastic changes in elevation, temperature, barometric pressure, relative humidity, and/or any other environmental condition.

In another embodiment, instead of automatically causing the vehicle settings to be optimized, the wireless device 160 displays recommend settings to be optimized on the display 162 and the user selects whether or not to change the vehicle settings to the recommended optimized settings.

Figure 4:
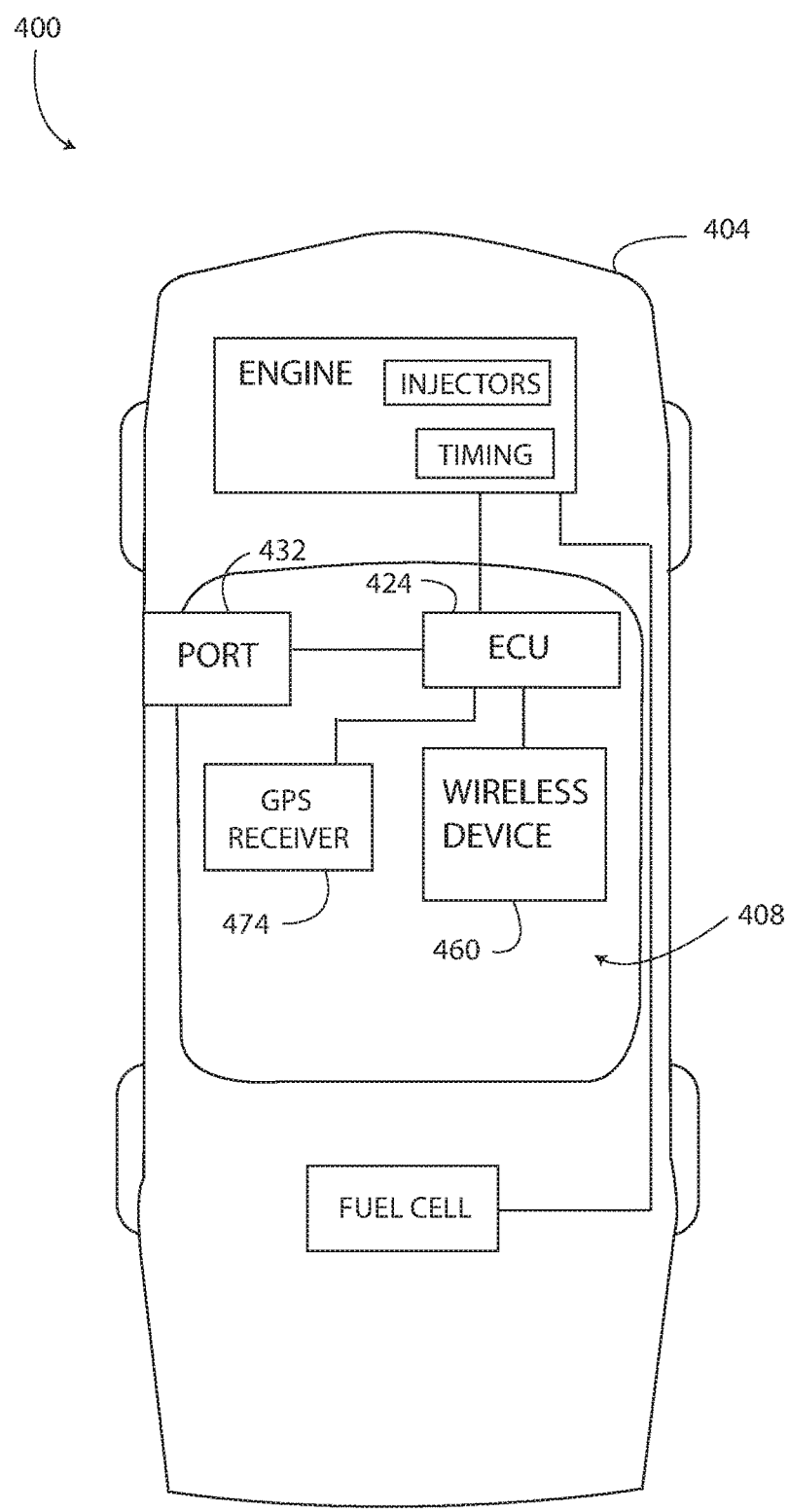
FIG. 4 is a block diagram showing a top plan view of a vehicle including a system for optimizing settings of the vehicle.

As shown in FIG. 4, in another embodiment, an optimization system 400 is "built-in" to a vehicle 404. The vehicle 404 is the same as the vehicle 104 (FIG. 1) except that the vehicle 404 includes a GPS receiver 474 and a wireless device 460 that are "non-removable" from the vehicle. The GPS receiver 474 and the wireless device 460 are "non-removable" in the sense that the GPS receiver and the wireless device are not removed from the vehicle 404 upon exit of the vehicle by the operator, unlike the wireless device 160 of the optimization system 100 (FIG. 1), which is typically carried on the person of the operator. The GPS receiver 474 and the wireless device 460 are connected directly to the ECU 424. The GPS receiver 474, in one embodiment, is included in a vehicle navigation system of the vehicle 404.

The wireless device 460 is configured to access data generated by the GPS receiver 474 through the ECU 424. In another embodiment, the wireless device 460 is connected directly to the ECU 424 and to the GPS receiver 474. In yet another embodiment, the GPS receiver 474 is included in the wireless device 460, as in the wireless device 160 (FIG. 1). The wireless device 460 may include a display (not shown) or may be electrically connected to the display (not shown) of a different vehicle system.

The optimization system 400 does not include the dongle 150 (FIG. 1), since the wireless device 460 is connected directly to the ECU 424. Software used by the dongle 150 for communication with the ECU 124 is stored in a memory (not shown) of the wireless device 460. Also, since the optimization system 100 does not include the dongle 150, the port 432 is available for use with other types of vehicle systems and diagnostic systems. In one embodiment, the vehicle 404 having the optimization system 400 does not include the port 432.

The optimization system 400 operates in substantially the same manner as the optimization system 100 to determine optimum vehicle settings and then to configure the ECU 424 to use the optimum vehicle settings. In determining the current vehicle settings, current vehicle setting data are transferred to the wireless device 460 without being transferred to a dongle 150. Further, after the wireless device 460 determines the optimum settings, optimum setting data are transferred to the ECU 424, without being transferred to a dongle 150.

In another embodiment, the vehicle 104, 404 uses an Ethernet connection, such as a diagnostic over Internet Protocol (DoIP) to transmit data between the ECU 124, 424 and the onboard sensors, components, and systems in the vehicle. The DoIP, or other equivalent data networks in a vehicle, provides a communication framework between the ECU 124, 424 and the various sensors and systems in the vehicle 104, 404. The DoIP transmits/receives the information to/from an external device, such as the wireless device 160, 460. The external device, in another embodiment, is provided as a tablet, a smart cellular phone, a computer unit, a wearable device, a diagnostic tool, a scan tool, or the like. In some cases, the dongle 150 is therefore not required and yet the optimization system 100, 400 is able to perform, deliver, and achieve the results, as described above.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of optimizing vehicle settings of a vehicle using an optimization system, the optimization system including a dongle and a wireless device, and the vehicle including an engine, a diagnostic port, and an electronic control unit (ECU) electrically connected to the diagnostic port and including a memory storing vehicle setting data, the method comprising:

establishing a wired communication link between the ECU and the dongle by connecting the dongle to the diagnostic port;

establishing a wireless communication link between the ECU and the wireless device via the connected dongle;

determining location data representative of a location of the vehicle by wirelessly receiving signals representative of a location of the wireless device using the wireless device;

determining environmental condition data at the location of the vehicle using the wireless device, the environmental condition data including at least one of temperature data, altitude data, atmospheric pressure data, and relative humidity data;

sending the vehicle setting data from the ECU to the wireless device via the connected dongle by the wireless communication link;

generating optimized vehicle setting data with the wireless device using at least the sent vehicle setting data and the determined environmental condition data, the generated optimized vehicle setting data stored only in a memory of the wireless device;

sending the generated optimized vehicle setting data from the wireless device to the ECU via the connected dongle; and changing the vehicle setting data stored in the memory of the vehicle to the sent optimized vehicle setting data with the ECU, such that the engine of the vehicle is operated with the sent optimized vehicle setting data, wherein generating the optimized vehicle setting data comprises (i) processing the vehicle setting data with OBD software stored in a memory of the wireless device using a processor of the wireless device to determine at least one of engine timing setting data and fuel injector setting data, and (ii) optimizing at least one of the engine timing setting data and the fuel injector setting data, wherein operating the ECU according to the optimized vehicle setting data comprises (i) controlling an ignition timing system of the engine of the vehicle according to the optimized engine timing setting data, and (ii) controlling at least one fuel injector of the engine according to the optimized fuel injector setting data, and wherein prior to sending the generated optimized vehicle setting data from the wireless device to the ECU via the connected dongle, the generated optimized vehicle setting data are not stored in the memory of the vehicle.

2. The method of optimizing vehicle settings of claim 1, wherein determining the location data comprises:

receiving GPS data with a GPS receiver of the wireless device; and processing the received GPS data with a processor of the wireless device to determine the location data, the location data including latitude data and longitude data.

3. The method of optimizing vehicle settings of claim 1, wherein generating the optimized vehicle setting data comprises:

processing the vehicle setting data, the environmental condition data, and an algorithm stored in a memory of the wireless device with a processor of the wireless device to generate the optimized vehicle setting data.

4. The method of optimizing vehicle settings of claim 3, wherein generating the optimized vehicle setting data comprises:

referencing look up tables stored in the memory of the wireless device with the processor of the wireless device.

5. The method of optimizing vehicle settings of claim 1, wherein generating optimized vehicle setting data comprises:

establishing a wireless communication link between the wireless device and a remote computer via a transceiver of the wireless device;

wirelessly sending at least the vehicle setting data and the environmental condition data to the remote computer from the wireless device with the transceiver;

generating the optimized vehicle setting data with the remote computer by processing at least the vehicle setting data and the environmental condition data; and sending the generated optimized vehicle setting data from the remote computer to the transceiver of the wireless device.

6. The method of optimizing vehicle settings of claim 1, further comprising:

using the wireless device as a cellular phone.

* * * * *